United States Patent
Gambetta

(10) Patent No.: US 9,397,565 B2
(45) Date of Patent: Jul. 19, 2016

(54) PHASE OFFSET COMPENSATION FOR MULTIPHASE DC-DC CONVERTER

(71) Applicant: Dialog Semiconductor GmbH, Kirchheim/Teck-Nabern (DE)

(72) Inventor: Pietro Gambetta, Munich (DE)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 106 days.

(21) Appl. No.: 14/200,623

(22) Filed: Mar. 7, 2014

(65) Prior Publication Data
US 2015/0115908 A1    Apr. 30, 2015

(30) Foreign Application Priority Data

Oct. 30, 2013 (EP) .................................. 13190874

(51) Int. Cl.
  *H02M 3/158* (2006.01)
  *H02M 1/00* (2006.01)

(52) U.S. Cl.
  CPC ............ *H02M 3/158* (2013.01); *H02M 3/1584* (2013.01); *H02M 3/1588* (2013.01); *H02M 2001/0032* (2013.01); *H02M 2003/1586* (2013.01); *Y02B 70/1466* (2013.01); *Y02B 70/16* (2013.01)

(58) Field of Classification Search
  USPC ......... 323/234, 237, 265, 268–269, 282–285; 363/59–60, 65
  See application file for complete search history.

(56) References Cited

U.S. PATENT DOCUMENTS

| | | | |
|---|---|---|---|
| 8,237,421 B1 * | 8/2012 | Shahani ................ | H02M 3/156 323/282 |
| 2006/0164057 A1 | 7/2006 | Kudo et al. | |
| 2008/0012540 A1 * | 1/2008 | Chen ....................... | H02M 1/38 323/224 |
| 2009/0184701 A1 * | 7/2009 | Yen ........................ | H02M 3/156 323/283 |
| 2010/0301826 A1 * | 12/2010 | Moussaoui ......... | H02M 3/1584 323/285 |
| 2010/0320983 A1 * | 12/2010 | Wu ...................... | H02M 3/1584 323/283 |
| 2011/0254526 A1 | 10/2011 | Luo et al. | |
| 2012/0001561 A1 * | 1/2012 | Balakrishnan ..... | H05B 33/0815 315/209 R |
| 2012/0187928 A1 | 7/2012 | Parto et al. | |

OTHER PUBLICATIONS

European Search Report 13190874.1-1809 Mailed: Apr. 15, 2014, Dialog Semiconductor GmbH.

* cited by examiner

*Primary Examiner* — Jeffrey Gblende
(74) *Attorney, Agent, or Firm* — Saile Ackerman LLC; Stephen B. Ackerman

(57) ABSTRACT

The present document relates to multiphase DC-DC power converters. In particular, the present document relates to the compensation of the phase offset incurred in multiphase DC-DC power converters which are controlled based on coil current zero crossing. A control circuit for a multiphase power converter is described. The multiphase power converter comprises a first and a second constituent switched-mode power converter, wherein the first and second constituent power converters provide first and second phase currents, respectively. The first and second phase currents contribute to a joint load current of the multiphase power converter. The first and second constituent power converters comprise first and second half bridges with first and second high side switches and first and second low side switches, respectively.

22 Claims, 6 Drawing Sheets

PHASE OFFSET COMPENSATION FOR MULTIPHASE DC-DC CONVERTER

TECHNICAL FIELD

The present document relates to multiphase DC-DC power converters. In particular, the present document relates to the compensation of the phase offset incurred in multiphase DC-DC power converters which are controlled based on coil current zero crossing.

BACKGROUND

In DC (Direct Current)-DC power converters, such as buck converters, information regarding the zero crossing of the coil current may be used as an indication for the detection of a relatively low load of the power converter. The control of the power converter may then transition from a pulse width modulation (PWM) control mode (with a pre-determined switching frequency or commutation cycle rate) to pulse frequency modulation (PFM) control mode (with a changing switching frequency), in order to reduce the switching losses of the power converter.

Multiphase DC-DC power converters may be used to increase the amount of electrical power which can be provided at the output of the power converter, and/or in order to reduce the ripple of the output current which is provided at the output of the power converter. Such multiphase power converters may comprise a plurality of parallel constituent power converters, which may be operated in a plurality of different phases. The constituent power converters may provide respective fractions of the total output current and/or the total output power of the multiphase power converter. In other words, the plurality of constituent output currents (also referred to as the phase currents) which are provided by the plurality of constituent power converters, respectively, typically add up to the total output current (also referred to as the load current) provided by the multiphase power converter.

Differences in the parameters of the constituent power converters (e.g. caused by variances of a manufacturing process) may lead to differences in the phase currents which are provided by the plurality of constituent power converters. In other words, the phase currents which are provided by the different constituent power converters may differ from one another. In yet other words, the multiphase power converter may exhibit phase current offsets. Such phase current offsets may lead to a situation where the transition from a PWM control mode to a PFM control mode (i.e. where the detection of a low load condition) based on the zero crossing of the phase currents cannot be performed in a reliable manner. In particular, in the presence of phase current offsets, the control of the multiphase power converter based on the phase currents may lead to instability problems and/or to increased switching losses of the multiphase power converter.

The present document addresses the above mentioned technical issues. In particular, the present document addresses the technical problem of providing a control circuit and a corresponding control scheme for controlling a multiphase power converter at relatively low loads in a stable and energy efficient manner.

SUMMARY

According to an aspect, a control circuit for a multiphase power converter is described. The multiphase power converter comprises a first and a second constituent switched-mode power converter. In general terms, the multiphase power converter may comprise N (N>1) constituent power converters. The constituent power converters may be arranged in parallel with respect to one another. Furthermore, the first and second constituent power converters may be or may comprise DC-DC power converters, such as buck converters or boost converters.

The first and second constituent power converters (as well as further constituent power converters) may comprise first and second half bridges with first and second high side switches and first and second low side switches, respectively. The switches may be or may comprise transistors, such as metal oxide semiconductor (MOS) field effect transistors (FETs). The half bridges may be arranged between a high potential (e.g. a supply voltage or input voltage) and a low potential (e.g. ground).

The first and second constituent power converters may be operated in different phases with regards to one another. By way of example, for a multiphase power converter comprising N constituent power converters the constituent power converters may be operated with a phase shift of 360/N degrees with respect to one another.

The first and second constituent power converters may provide first and second phase currents, respectively. The first and second phase currents may contribute to a joint load current of the multiphase power converter. In particular, the phase currents of all the constituent power converters of the multiphase power converter may add up to the joint load current. The first and second constituent power converters may comprise a first and second inductor, respectively. The first and second phase currents may traverse the first and second inductors, respectively. In particular, the first and second phase currents may correspond to the first and second inductor currents.

Due to design and/or parameter differences between the different constituent power converters, the phase currents of the different constituent power converters may have different absolute and/or average values. These differences between the phase currents may be referred to as phase current offsets. In particular, the first phase current may be smaller than the second phase current, due to a phase current offset of the multiphase power converter. As a result of this, the first phase current may exhibit a zero crossing prior to the second phase current, when the load current is decreasing.

The control circuit is configured to operate the first and second constituent power converters in a pulse width modulation (PWM) mode. When operating the multiphase power converter in a PWM mode, the switches of the constituent power converters are typically switched at a constant commutation cycle rate. Within each commutation cycle, the high side switches of the constituent power converters may be put into on-state and off-state once, in an alternating manner. The low side switches may be operated in a complementary manner with regards to the respective high side switches. In particular, the low side switch of a constituent power converter may be in off-state when the respective high side switch is in on-state, and vice versa.

The control circuit is configured to detect a zero crossing of the first phase current at a first time instant, when the first high side switch is in off-state. In other words, it may be detected that the first phase current falls below zero at the first time instant. Such a condition may be taken as an indication for a relatively low load current. In particular, such a condition may be taken as an indication that the load current falls below a pre-determined first load current threshold.

The control circuit may be further configured to operate the first low side switch as an active diode, upon detecting or subsequent to detecting the zero crossing of the first phase current. Nevertheless, the control circuit may proceed in operating the multiphase power converter in a PWM mode. For operating the first load side switch as an active diode, the control circuit may be configured to turn off the first low side switch, based on information regarding the first phase current (e.g. based on an indication of the first phase current provided by current sensing means). In particular, the control circuit may be configured to turn off the first low side switch, such that the first phase current does not fall below a pre-determined phase current threshold (wherein the phase current threshold may be zero).

It should be noted that, when operating the first low side switch as an active diode, the first low side switch and the first high side switch are typically not operated in a complementary manner with respect to one another. When operating the first low side switch as an active diode, the first low side and high side switches may be concurrently in the off-state.

By operating the first low side switch as an active diode; it may be ensured that the first phase current does not fall below zero. This ensures that if the load current decreases even further, the second phase current has to decrease as well, because the decreasing load current cannot be compensated by a negative first phase current. This ensures that, as the load current decreases and falls below a second load current threshold (which is smaller than the first load current threshold), also the second phase current will exhibit a zero crossing, thereby enabling a reliable and stable transition from PWM mode to PFM mode.

The control circuit may be configured to set a zero crossing flag for a constituent power converter, subsequent to detecting a zero crossing of the respective phase current of the constituent power converter. The zero crossing flag may indicate that the phase current of the respective constituent power converter is exhibiting zero crossings. The zero crossing flag for a constituent power converter may be reset, if an absence of a zero crossing of the respective phase current of the constituent power converter is detected (e.g. within one or more duty cycles). Hence, an increase of the phase current will lead to the zero crossing flag of the respective constituent power converter being reset. As such, the zero crossing flag provides an indication regarding the level of the phase current of the respective constituent power converter.

In particular, the control circuit may be configured to set the zero crossing flag for a constituent power converter, upon detecting a pre-determined number (e.g. 1, 2, 3, 4 or 5) of zero crossings of the respective phase current of the constituent power converter within a pre-determined number (e.g. 1, 2, 3, 4 or 5) of consecutive duty cycles. By setting the zero crossing flag only subsequent to a pre-determined number of consecutive zero crossings, instabilities (e.g. caused by noise) can be excluded. As a result of this, the stability of the operation of the multiphase power converter is increased.

The control circuit may be configured to operate the first low side switch as an active diode, if the respective zero crossing flag of the first constituent power converter is set. On the other hand, the first low side switch may be operated in a complimentary manner with regards to the first high side switch, if the respective zero crossing flag is not set. The same may apply to the low side switches of the other constituent power converters of the multiphase power converter.

The control circuit may be configured to, subsequent to detecting the zero crossing of the first phase current, detect a zero crossing of the second phase current at a second time instant, when the second high side switch is in off-state. In particular, the control circuit may be configured to determine that the conditions for setting the zero crossing flag for the second constituent power converter are met, after having set the zero crossing flag for the first constituent power converter.

Subsequent to detecting the zero crossings of the first and second phase currents, the first and second constituent power converters may be operated in a pulse frequency modulation (PFM) mode. In other words, the transition from PWM mode to PFM mode may occur subsequent to detecting zero crossings for the first and second phase currents. When operating the multiphase power converter in a PFM mode, the commutation cycle rate is typically variable, i.e. the commutation cycles typically exhibit a variable length. By performing the transition from PWM mode to PFM mode, after the detection of zero crossing in a plurality of constituent power converters, the load current threshold for the transition towards PFM mode can be reduced, thereby increasing the stability of the operation of the multiphase power converter.

As indicated above, the multiphase power converter may comprise a plurality of N constituent power converters. The control circuit may be configured to monitor the zero crossings for all the constituent power converters of the multiphase power converter. As soon as a zero crossing is detected and/or as soon as a zero crossing flag has been set, the low side switch of the respective constituent power converter may be operated as an active diode. This ensures that the phase currents of the constituent power converters, for which no zero crossing has been detected and/or for which no zero crossing flag has been set, continue to decrease with decreasing load currents. In particular, this ensures that eventually for all constituent power converters of the multiphase power converter a zero crossing is detected and/or a zero crossing flag is set (as the load current decreases).

As outlined above, the low side switches of the constituent power converters pass from a complimentary operation to an active diode operation one by one, as zero crossings are detected for the respective phase currents and/or as zero crossing flags are set of the respective constituent power converters. Alternatively, the control circuit may be configured to operate the second low side switch (and any other low side switches) as an active diode, upon detecting the zero crossing of the first phase current. In other words, as soon as a zero crossing is detected for one of the plurality of constituent power converters, all low side switches may be operated as active diodes. This may also ensure a reliable detection of zero crossings for all constituent power converters (as the load current decreases).

The control circuit may be configured to determine that a zero crossing has been detected for all the phase currents of all the constituent power converters of the multiphase power converter. Furthermore, the control circuit may be configured to, subsequent to or upon determining that a zero crossing has been detected for all the phase currents, operate all the constituent power converters of the multiphase power converter in a PFM mode. Alternatively or in addition, the control circuit may be configured to operate the multiphase power converter in a PFM mode, if the zero crossing flags are set for all the constituent power converters of the multiphase power converter. By doing this, it can be ensured that the multiphase power converter transitions from PWM mode to PFM mode in a stable and energy efficient manner.

As outlined above, the active diode operation of a low side switch may be aborted, upon resetting the zero crossing flag of the respective constituent power converter. The zero crossing flag may be reset, if the respective phase current does not exhibit a zero crossing in one or more consecutive duty cycles. Alternatively or in addition, the control circuit may be configured to determine that the first phase current exceeds a pre-determined current threshold. Upon determining that the first phase current exceeds the pre-determined load current threshold, the active diode operation of the first low side switch may be aborted, and the first low side switch may be operated in a complementary manner with regards to the first high side switch. By doing this, it can be ensured that the multiphase power converter returns to conventional PWM-mode operation, if the load current increases.

As outlined above, when operated in PFM mode, the commutation cycle rate may vary. The control circuit may be configured to determine a time instant for turning on the first and/or second high side switches based on a joint output voltage of the multiphase power converter, when in PFM mode. The output voltage may be compared to a reference voltage. If the output voltage is smaller than the reference voltage, the first and/or second high side switches may be put into on-state. On the other hand, if the output voltage is equal to or higher than the reference voltage, the first and/or second high side switches may be put into off-state. The PFM mode is typically beneficial for relatively low load currents, due to reduced switching losses of the switches of the constituent power converters.

On the other hand, when operated in PWM mode, the commutation cycle rate may be constant. This may be achieved by comparing an error voltage (indicating the deviation of the output voltage from the reference voltage) with a saw wave signal having the predetermined commutation cycle rate. As such, a changing error voltage may lead to a changing duty cycle, while the commutation cycle rate remains constant. The control circuit may be configured to determine the duty cycle of the first and/or second high side switches based on the joint load current and/or based on the joint output voltage of the multiphase power converter, when in PWM mode. The PWM mode is typically beneficial for providing relatively high load currents in a reliable manner.

According to a further aspect, a control circuit for a multiphase power converter is described, wherein the multiphase power converter comprises a first and a second constituent switched-mode power converter, wherein the first and second constituent power converters provide first and second phase currents, respectively, wherein the first and second phase currents contribute to a joint load current of the multiphase power converter, wherein the first and second constituent power converters comprise first and second half bridges with first and second high side switches and first and second low side switches, respectively; wherein the control circuit is configured to operate the first and second constituent power converters in a pulse width modulation (PWM) mode with a constant commutation cycle rate, operate the low side switches in a complementary manner with regards to the respective high side switches, detect a zero crossing of the first phase current at a first time instant, when the first high side switch is in off-state, and operate the first low side switch as an active diode, upon detecting the zero crossing of the first phase current.

According to another aspect, a multiphase power converter is described. The multiphase power converter comprising a first and a second constituent switched-mode power converter; wherein the first and second constituent power converters provide first and second phase currents, respectively, wherein the first and second phase currents contribute to a joint load current of the multiphase power converter, wherein the first and second constituent power converters comprise first and second half bridges with first and second high side switches and first and second low side switches, respectively; and a control circuit, wherein the control circuit is configured to operate the first and second constituent power converters in a pulse width modulation (PWM) mode with a constant commutation cycle rate, operate the low side switches in a complementary manner with regards to the respective high side switches, detect a zero crossing of the first phase current at a first time instant, when the first high side switch is in off-state, and operate the first low side switch as an active diode, upon detecting the zero crossing of the first phase current.

According to another aspect, a method for operating a multiphase power converter is described, wherein the multiphase power converter comprises a first and a second constituent switched-mode power converter; wherein the first and second constituent power converters provide first and second phase currents, respectively, wherein the first and second phase currents contribute to a joint load current of the multiphase power converter, wherein the first and second constituent power converters comprise first and second half bridges with first and second high side switches and first and second low side switches, respectively; wherein the method comprises operating the first and second constituent power converters in a pulse width modulation (PWM) mode with a constant commutation cycle rate operating the low side switches in a complementary manner with regards to the respective high side switches, detecting a zero crossing of the first phase current at a first time instant, when the first high side switch is in off-state, and operating the first low side switch as an active diode, upon detecting the zero crossing of the first phase current.

According to a further aspect, a multiphase power converter is described. The multiphase power converter comprises a first and a second constituent switched-mode power converter. The first and second constituent power converters may provide first and second phase currents, respectively, wherein the first and second phase currents contribute to a joint load current of the multiphase power converter. The first and second constituent power converters may comprise first and second half bridges with first and second high side switches and first and second low side switches, respectively. Furthermore, the multiphase power converter comprises a control circuit as described in the present document, for operating the first and second constituent power converters.

According to another aspect, a method for operating a multiphase power converter is described. The multiphase power converter comprises a first and a second constituent switched-mode power converter, wherein the first and second constituent power converters may comprise first and second half bridges with first and second high side switches and first and second low side switches, respectively. The first and second constituent power converters provide first and second phase currents, respectively, wherein the first and second phase currents contribute to a joint load current of the multiphase power converter. The method comprises operating the first and second constituent power converters in a pulse width modulation mode with a constant commutation cycle rate. In this context, the low side switches may be operated in a complementary manner with regards to the respective high side switches. The method may proceed in detecting a zero crossing of the first phase current at a first time instant, when the first high side switch is in off-state. Furthermore, the method may comprise operating the first low side switch as an active diode, upon detecting the zero crossing of the first phase current.

According to a further aspect, a software program is described. The software program may be adapted for execution on a processor and for performing the method steps outlined in the present document when carried out on the processor.

According to another aspect, a storage medium is described. The storage medium may comprise a software program adapted for execution on a processor and for performing the method steps outlined in the present document when carried out on the processor.

According to a further aspect, a computer program product is described. The computer program may comprise executable instructions for performing the method steps outlined in the present document when executed on a computer.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple" or "coupled" refers to elements being in electrical communication with each other, whether directly connected e.g., via wires, or in some other manner.

BRIEF DESCRIPTION OF THE DRAWINGS

The invention is explained below in an exemplary manner with reference to the accompanying drawings, wherein.

DESCRIPTION

Figure 1:
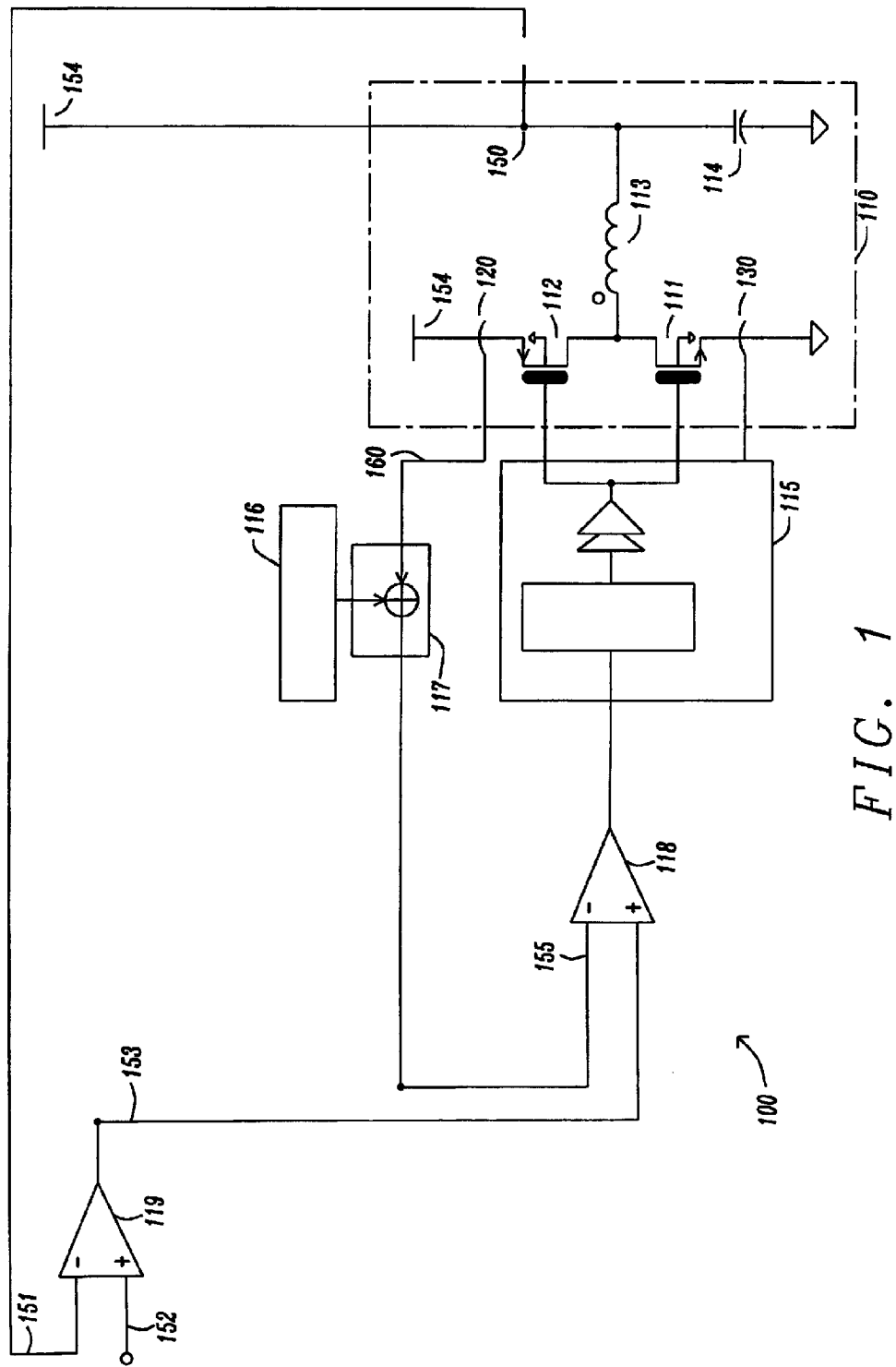
FIG. 1 illustrates a block diagram of an example DC-DC power converter.

FIG. 1 shows an example buck converter system 100. It should be noted that even though the following aspects are described in the context of a buck converter 110, the aspects are also applicable to other DC-to-DC converter, e.g. other DC-to-DC step-down converters or DC-to-DC step-up converters. The system 100 comprises a buck converter 110 comprising a high side switch 112 (e.g. a PMOS transistor) and a low side switch 111 (e.g. a NMOS transistor), as well as a buck inductor 113 and a buck capacitor 114. The duty cycle of the buck converter 110 (i.e. the duty cycle of the high side switch 112) is controlled via a feedback voltage Vfb 151 which is equal to (or proportional to) the output voltage Vout 150. The feedback voltage Vfb 151 is compared to a reference voltage Vref 152 using e.g. a differential amplification unit (also referred to as an error amplifier) 119, thereby providing an error voltage Verror 153. In stable operation, when the output voltage Vout 150 corresponds to the desired output voltage of the converter system 100, the error voltage Verror 153 should approximate zero or should take on a pre-determined default error value (e.g. zero) which may be tuned using the reference voltage Vref 152. However, in case of load transients, the output voltage Vout 150 may dip, thereby causing a bump in the error voltage Verror 153 above the default error value.

Overall, the error voltage Verror 153 may be used to regulate the output voltage Vout 150 provided by the converter system 100. The regulation of the output voltage Vout 150 may be achieved by controlling the duty cycle of the high side switch 112. This duty cycle may be controlled using the error voltage Verror 153. For example, the error voltage Verror 153 may be compared with a saw wave voltage signal 155 having a pre-determined cycle length (thereby providing a pre-determined and fixed commutation cycle rate). The cycle length typically corresponds to the cycle length of the buck converter 110 (i.e. the length of an on-state and a succeeding off-state of the high side switch 112). The saw wave voltage signal 155 typically has a maximum voltage Vsaw at the peak of each saw tooth. The saw wave voltage signal may be generated by the saw wave generator 116. The saw wave voltage signal 155 is compared to the error voltage Verror 153 using comparator 118 (e.g. a hysteretic comparator), thereby generating a pulse width modulated signal which is negative (or zero) when the saw wave voltage signal is greater than Verror, and positive when the saw wave voltage is smaller than Verror. The transition from negative to positive may be taken as a trigger for the duty cycle. In particular, the (pulse width modulated (PWM) signal generated by the comparator 118 may be converted by the buck control unit (also referred to as control circuit) 115 to generate the drive signals for the high side switch 112 and for the low side switch 111 of the buck converter 110. The regulator can be tuned by appropriately choosing the maximum voltage Vsaw and the reference voltage Vref 152 based on the input voltage Vin 154 and/or based on the desired output voltage 150.

The regulation of the duty cycle of the buck converter 110 can be enhanced by also taking into account the inductor current, i.e. the current through the inductor 113 of the buck converter. For this purpose, the converter system 100 comprises current sensing means 120 for sensing the current through the high side transistor 112 (which corresponds to the inductor current when the high side switch 112 is in on-state (and the low side switch 111 is in off-state)). The current sensing means 120 may e.g. be implemented as a current mirror, which mirrors and possibly amplifies the current through the high side switch 112. The sensed current Isns 160 provided by the current sensing means 120 is therefore typically proportional (or equal) to the current through the high side switch 112 (and the inductor 113, when the high side switch is in its on-state). At 100% duty cycle of the buck converter 110 and in stable operation, the current through the high side switch 112 is typically constant and corresponds to the input voltage Vin 154 divided by the impedance of the load Rload of the converter system 100.

The sensed current Isns 160 is added in addition unit 117 to the saw wave signal having the cycle length of the buck converter 110. The adding unit 117 further converts the sum of the saw wave signal and the sensed current Isns 160 into a sensed saw wave voltage Visns 155. The saw wave signal may be generated by the saw wave generator 116 (comprising e.g. a switch (e.g. a transistor) in parallel to a capacitor). Overall, the saw wave generator 116 and the adding unit 117 provide the sensed saw wave voltage Visns 155 which comprises a periodic saw wave voltage signal (generated by the saw wave generator 116) which is offset by a voltage derived from the sensed current Isns 160. As indicated above, Isns 160 is a constant current in case of a stable operation of the buck converter 110 at 100% duty cycle. In such cases, the sensed saw wave voltage Visns 155 corresponds to the periodic saw wave voltage signal offset by a constant voltage derived from the constant current Isns 160. In case of a duty cycle lower than 100%, the sensed current Isns is zero (when the high side switch 112 is in off-state) and has a saw like rising shape (when the high side switch 112 is in on-state). The saw like rising shape of the sense current Isns 160 during the on-state of the high side switch 112 results from the current throttling properties of the inductor (also referred to as a coil) 113. Hence, in cases of a duty cycle of less than 100%, the sensed saw wave voltage Visns 155 is obtained as an overlay of the periodic saw wave voltage signal and an intermittent saw shaped voltage derived from the sensed current Isns 160. It should be noted that the sensed saw wave voltage Visns 155 may be reset every time the high side switch 112 is switched off. The reset of the sensed saw wave voltage Visns 155 may result in a cleaner signal. The sensed saw wave voltage Visns 155 is a signal with a positive slope. Visns 155 crosses the error voltage Verror 153, if the error voltage Verror 153 is in the range which is covered by the sensed saw wave voltage Visns 155 during a clock cycle (i.e. during a commutation cycle).

In the converter system 100 of FIG. 1, the sensed saw wave voltage Visns 155 is compared to the error voltage Verror 153 to generate the pulse width modulated signal PWM towards the driver and controller circuit 115 of the buck converter 110. In case of a load transient (e.g. a sudden increase of the load current), the sensed current Isns 160 increases, thereby increasing the slope of the sensed saw wave voltage Visns 155. At the same time, the output voltage Vout 150 may drop, leading to an increase of the error voltage Verror 153. Both effects tend to move forward the trigger point for the pulse width modulated (PWM) signal, thereby increasing the duty cycle of the buck converter 110 and thereby compensating the effect of the load transient.

In case of decreasing load currents, the duty cycle of the buck converter 110 (i.e. the duty cycle of the high side switch 112) decreases, because less current (and less power) is drawn at the output of the converter 110. Nevertheless, the switching losses of the converter 110 remain unchanged, because the commutation cycle rate (which is defined by the periodicity of the saw wave signal which is generated by the saw wave generator 116) remains unchanged. As a result of this, the conversion efficiency of the system 100 decreases with decreasing load currents. In view of this, it may be beneficial to change from a PWM based control (as described above) to a pulse frequency modulation (PFM) based control, when the load current falls below a pre-determined load current threshold $I_{th}$. PFM based control allows to reduce the commutation cycle rate of the high side switch 112, thereby reducing the switching losses of the converter 110, as the load of the converter 110 decreases. As a result of this, the conversion efficiency of the system 100 can be increased (at low load conditions).

The system 100 may be configured to determine the inductor current through the buck inductor 113, at time intervals when the high side switch 112 is open and when the low side switch 111 is closed. For this purpose, the system 100 may comprise current sensing means 130 (comprising e.g. a shunt resistor and/or a current mirror) to sense the inductor current. The control unit 115 may be configured to monitor the inductor current during the off-phases of the high side switch 112. In particular, the control unit 115 may be configured to detect a zero crossing of the inductor current, when the inductor current transitions from a positive current (providing current towards the output of the converter 110) to a negative current (drawing current from the output of the converter 110). A zero crossing of the inductor current (which corresponds to the output current of the converter 110 during an off-phase of the high side switch 112) may be taken as a trigger to transition from PWM-based control to PFM based control. As a matter of fact, such a zero crossing event typically occurs, only if the required load current at the output of the converter 110 falls below the pre-determined load current threshold $I_{th}$. Hence, a zero crossing event which occurs while the power converter 110 is controlled using a PWM mechanism, can be viewed as an indicator for the fact that the load current falls below the pre-determined load current threshold $I_{th}$.

In the PFM based control mode, the system 100 may be configured to determine the on-phases of the high side switch 112 based on the error voltage 153 only (without comparing the error voltage 153 to the saw wave like signal 155). The high side switch 112 may be switched on, if the feedback voltage 151 falls below the reference voltage 152. On the other hand, the high side switch 112 may be switched off, if the feedback voltage 151 is equal to or higher than the reference voltage 152. The low side switch 111 may be switched in a complimentary manner to the high side switch 112 (i.e. the low side switch 111 may be switched off when the high side switch 112 is switched on, and vice versa).

Furthermore, when in PFM mode, the control unit 115 may be configured to monitor the inductor current, when the high side switch 112 is off and when the low side switch 111 is on. The control unit 115 may be configured to turn off the low side switch 111, upon detection of a zero crossing of the inductor current, thereby preventing negative inductor currents. As such, the inductor 113 may remain floating until the high side switch 112 is switched on again (subject to the detection of an error voltage 153).

Figure 2:
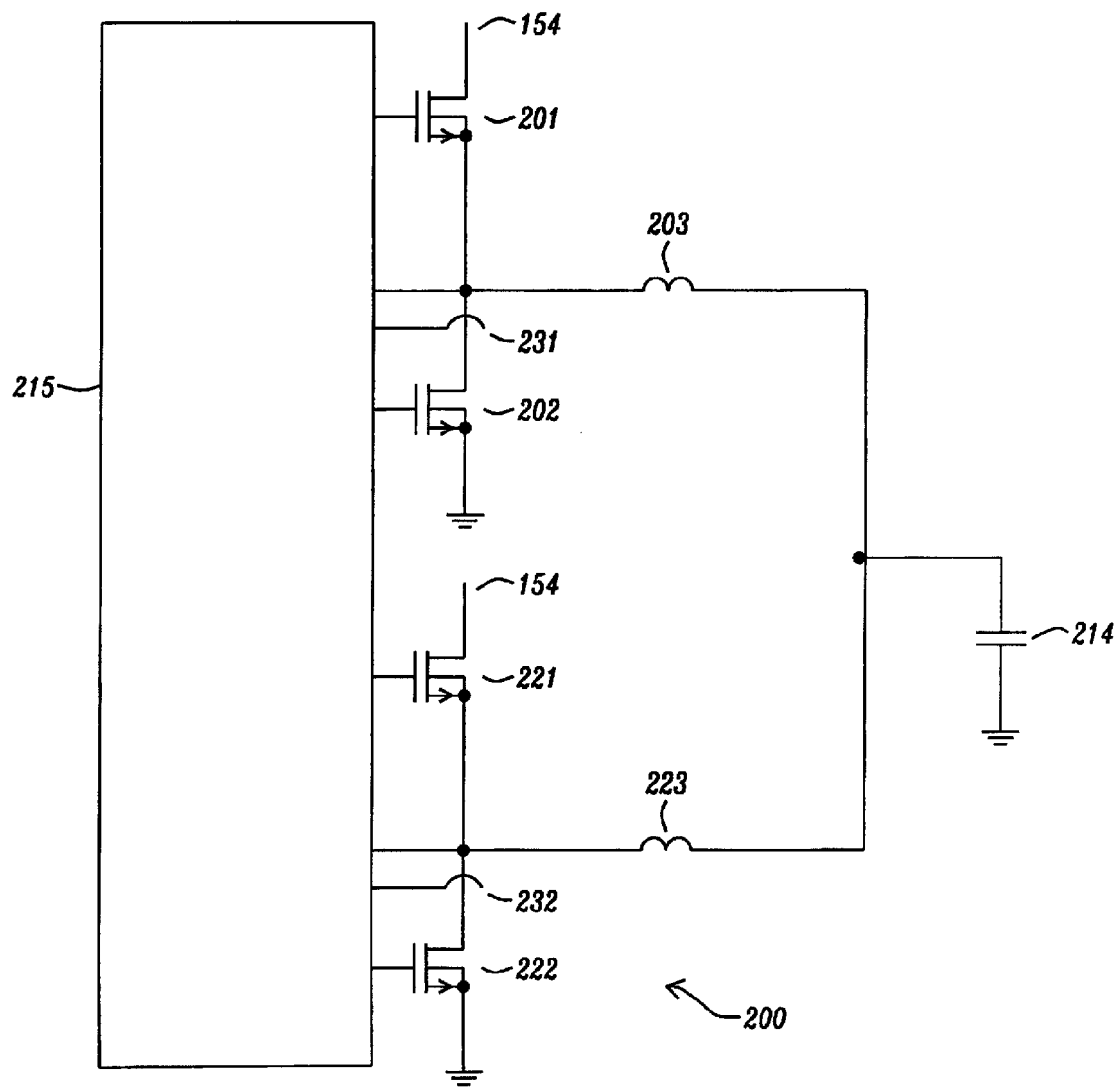
FIG. 2 shows a block diagram of an example multiphase power converter.

FIG. 2 shows a block diagram of an example two-phase buck power converter 200 comprising a first HS (high side) switch 201 of a first constituent power converter and a second HS switch 221 of a second constituent power converter. Furthermore, FIG. 2 shows an example control circuit 215 which is configured to control the switches of the first and second constituent power converters. The first constituent power converter comprises a first half bridge comprising the first HS switch 201 and a first low side (LS) switch 202, as well as a first inductor 203. In a similar manner, the second constituent power converter comprises a second half bridge comprising the second HS switch 221 and a second LS switch 222, as well as a second inductor 223. The first and second constituent power converters provide electrical energy to the output capacitor 214. The first and second half bridges comprise respective HS and LS switches which are arranged in series between the (positive) supply voltage 154 and ground. The respective inductors 203, 223 may be coupled to a midpoint of the respective half bridges, between the respective HS and LS switches.

The first and second constituent power converters and in particular the first and second half bridges may be operated at different phases with respect to one another, wherein the phase offset may be 180 degrees in case of a two-phase power converter. This also means that the first and second HS switches 201, 221 may be operated with a 180 degrees phase offset with respect to one another. In particular, this means that the on-states and/or the off-states of the first and second HS switches 201, 221 may be offset with respect to one another by the phase offset (of 180 degrees).

The multiphase power converter 200 of FIG. 2 also comprises current sensing means 231, 232 for measuring the inductor current (i.e. the phase current), during time intervals when the respective HS switches 201, 221 are off. The sum of the phase currents typically corresponds to the output current (or load current) of the converter 200, during time intervals when the respective HS switches 201, 221 are off.

The control unit 215 of the converter 200 may be configured to monitor the phase currents (using the information provided by the current sensing means 231, 232) and may be configured to detect a zero crossing of the phase currents. Furthermore, the control unit 215 may be configured to determine a time instant for transitioning from a PWMbased control of the plurality of constituent power converters to a PFM-based control, based on the sensed phase currents. In the present document, a method for performing a stable and energy efficient transition from PWMbased control to PFM based control is described.

In an ideal case, the transition from PWM based control to PFM based control should occur if the load current of the multiphase converter 200 is at of falls below a load current threshold given by $$I_{th} = \sum_{x=1}^{N} \frac{I_r(phx)}{2}$$

where $I_{th}$ is the load current threshold for the transition from PWM to PFM, where N is the number of constituent power converters and where $I_r(phx)$ is the ripple of the phase current of the $x^{th}$ constituent power converter of the multiphase power converter (for x=1, ..., N), when zero crossing occurs.

However, in a multiphase converter 200, the constituent power converters typically exhibit different phase currents. In other words, the multiphase converter 200 may exhibit phase current offsets, due to mismatch, noise and/or trimming residual errors. As a result of this, the zero crossings of the different phase currents will typically occur at different time instants. Consequently, there is no joint zero crossing time instant for the plurality of phase currents of the plurality of constituent power converters, and the question arises, which time instant to choose for transitioning from PWMbased control to PFM based control.

A possible approach could be to transition from PWM based control to PFM based control upon detection of a zero crossing of only a single one of the plurality of phase currents. Hence, the detection of zero crossing for a first one of the plurality of phase currents would lead to the use of PFM based control for all constituent power converters of the multiphase power converter 200. The transition based on the first detected zero crossing leads to an effective load current threshold $I_{th}$ of:

$$I_{th} = \sum_{x=1}^{N} \frac{I_r(phx)}{2} + \sum_{\substack{x=1 \\ i \neq x}}^{N} I_{os}(phx, phi)$$

wherein the second term represents the phase current offset of the different phases i and x (with i, x=1, ..., N). As can be seen, this load current threshold is higher than the above mentioned ideal load current threshold. The use of an increased load current threshold may lead to a situation where the multiphase power converter 200 is operated in PFM mode, even though the load current is relatively high. Hence, the multiphase power converter 200 may not be able to provide the power which is drawn at the output of the multiphase power converter 200. This may lead to a decreased efficiency of the power converter 200 and/or to an instable toggling between PWM based control and PFM based control (notably if the load current threshold for passing from PWM mode to PFM mode is higher than the load current threshold for passing from PFM mode to PWM mode).

Figure 3A:
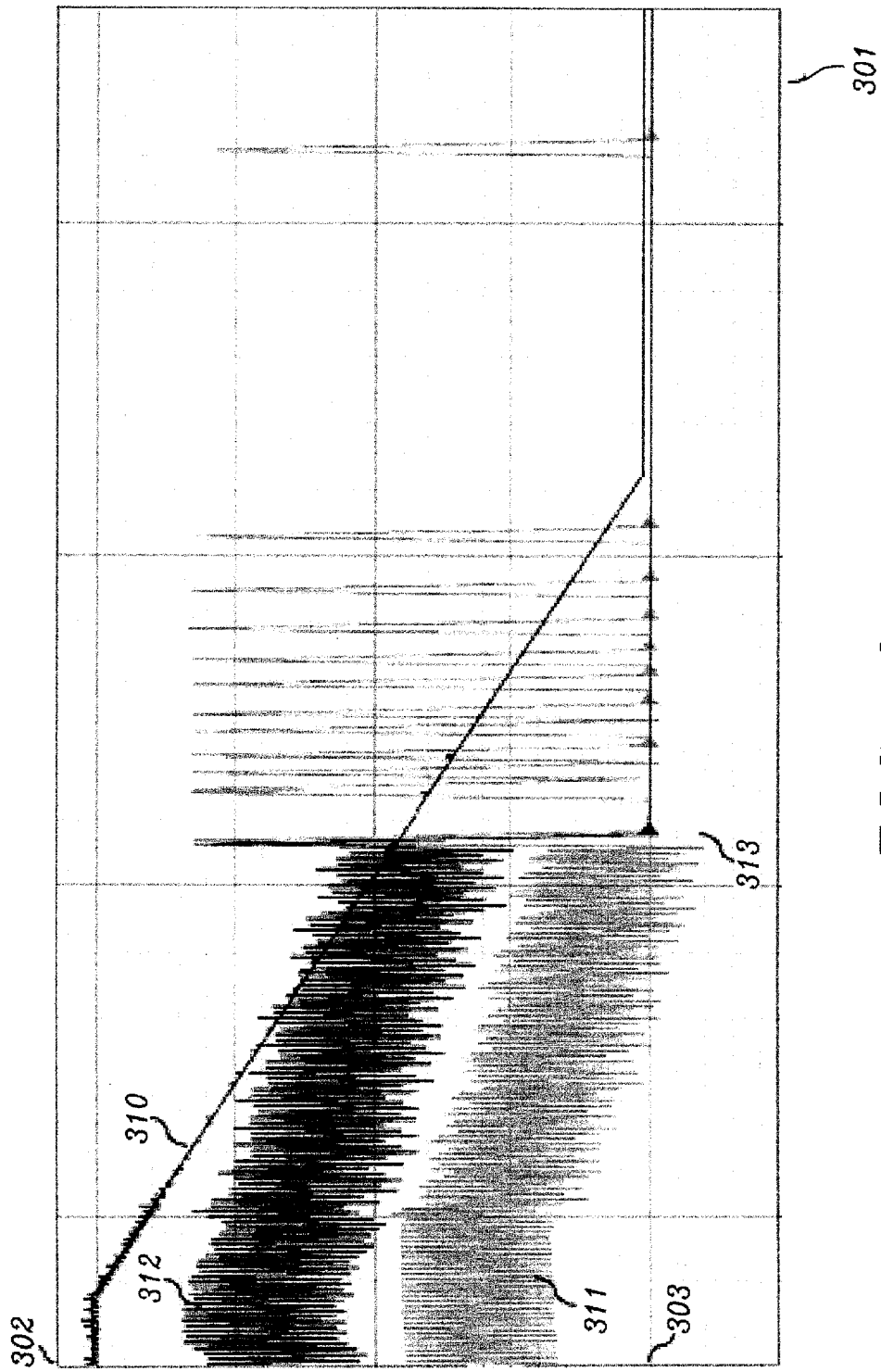
FIGS. 3a, 3b and 3c show example phase currents of a multiphase power converter during the transition from a high load condition to a low load condition.

FIG. 3a illustrates example currents of a two-phase power converter 200 using the above mentioned scheme for transitioning from PWM mode to PFM mode. FIG. 3 shows the currents 302 as a function of time 301. The load current 310 of the power converter 200 decreases along the time line 301. It can be seen that the load current 310 is provided as the sum of the first phase current 311 of the first constituent power converter and the second phase current 312 of the second constituent power converter. Due to the phase current offset, the first phase current 311 is smaller than the second phase current 312.

For relatively high load currents 310, the two-phase power converter 200 is operated in PWMmode. However, as the load current 310 decreases, the phase currents 311, 312 decrease. At time instant 313, a zero crossing of the first phase current 311 is detected, and as a result of this, the operation of the two-phase power converter 200 changes from PWM mode to PFM mode. As can be seen from the current peaks subsequent to time instant 313, the "early" transition from PWM mode to PFM mode leads to instabilities within the two-phase power converter 200.

A further approach to deciding upon a transition from PWM mode to PFM mode could be to perform the transition only if a zero crossing has occurred for all the phase currents of all the constituent power converters of the multiphase power converter 200. This leads to a reduced load current threshold $I_{th}$. However, this may lead to load current thresholds $I_{th}$ which are negative, such that no transition from PWM mode to PFM mode ever occurs, thereby reducing the power efficiency of the multiphase power converter 200.

Figure 3B:
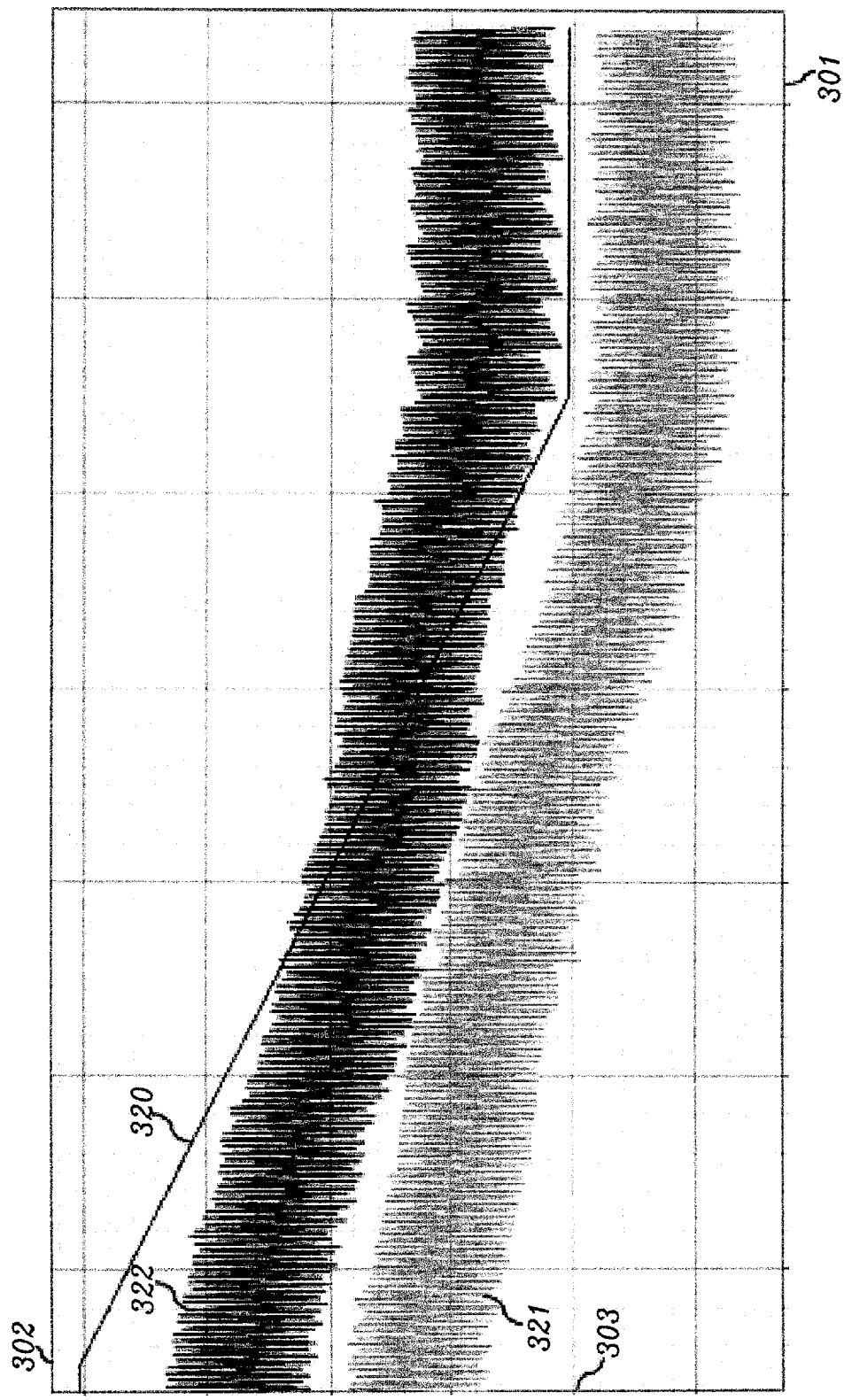

Such a situation is illustrated in FIG. 3b. The load current 320 decreases along the time line 301 until a load current of 0 (reference numeral 303) is reached. It can be seen that the second phase current 322 always remains above zero, such that no zero crossing can be detected for the second phase current. On the other hand, the first phase current 321 falls below zero. This leads to a situation where in case of no load (zero load current), a positive second phase current 322 is provided and a complementary negative first phase current 321 is provided, such that the resulting load current 320 is zero. In view of the fact that the second phase current 322 does not exhibit a zero crossing, the multiphase power converter 200 remains in PWMmode (even at zero load), thereby reducing the power efficiency of the power converter 200 (due to switching losses).

In view of the shortcomings of the transition schemes described in the context of FIGS. 3a and 3b, the following transition scheme is proposed in the present document. As soon as a zero crossing is detected in one of the plurality of constituent power converters, the active diode function of the low side switches 202, 222 of the constituent power converters is turned on. In particular, the active diode function of the first low side switch 202 of the first constituent power converter (which provides the first phase current) is active. At the same time, the multiphase power converter 200 is still operated in PWM mode. As a result of the activation of the active diode function of the first low side switch 202 (and possibly of the other low side switches 222) negative currents may be avoided. In this way the voltage loop will force the remaining phases to follow a decreasing load current. In particular, by avoiding negative phase currents, low values of a total load current 320 cannot be compensated by relatively high phase currents 322 in one of more constituent power converters. As such, it can be ensured that all the phase currents exhibit a zero crossing, when the load current 320 falls below a pre-determined load current threshold, which is close to the above mentioned ideal load current threshold.

It can be shown that the load current threshold for the above mentioned transition scheme lies in the range of:

$$I_{th} \in \left[ \frac{I_r(phH)}{2}; \sum_{x=1}^{N} \frac{I_r(phx)}{2} \right],$$

where $I_r(phH)$ is the current ripple of the phase with the highest offset. As can be seen, the maximum load current threshold is equal to the ideal load current threshold. The worst case threshold error is reduced to a value of $$\sum_{x=1}^{N} \frac{I_r(phx)}{2} - \frac{I_r(phH)}{2},$$

which is independent of the phase current offset.

Figure 3C:
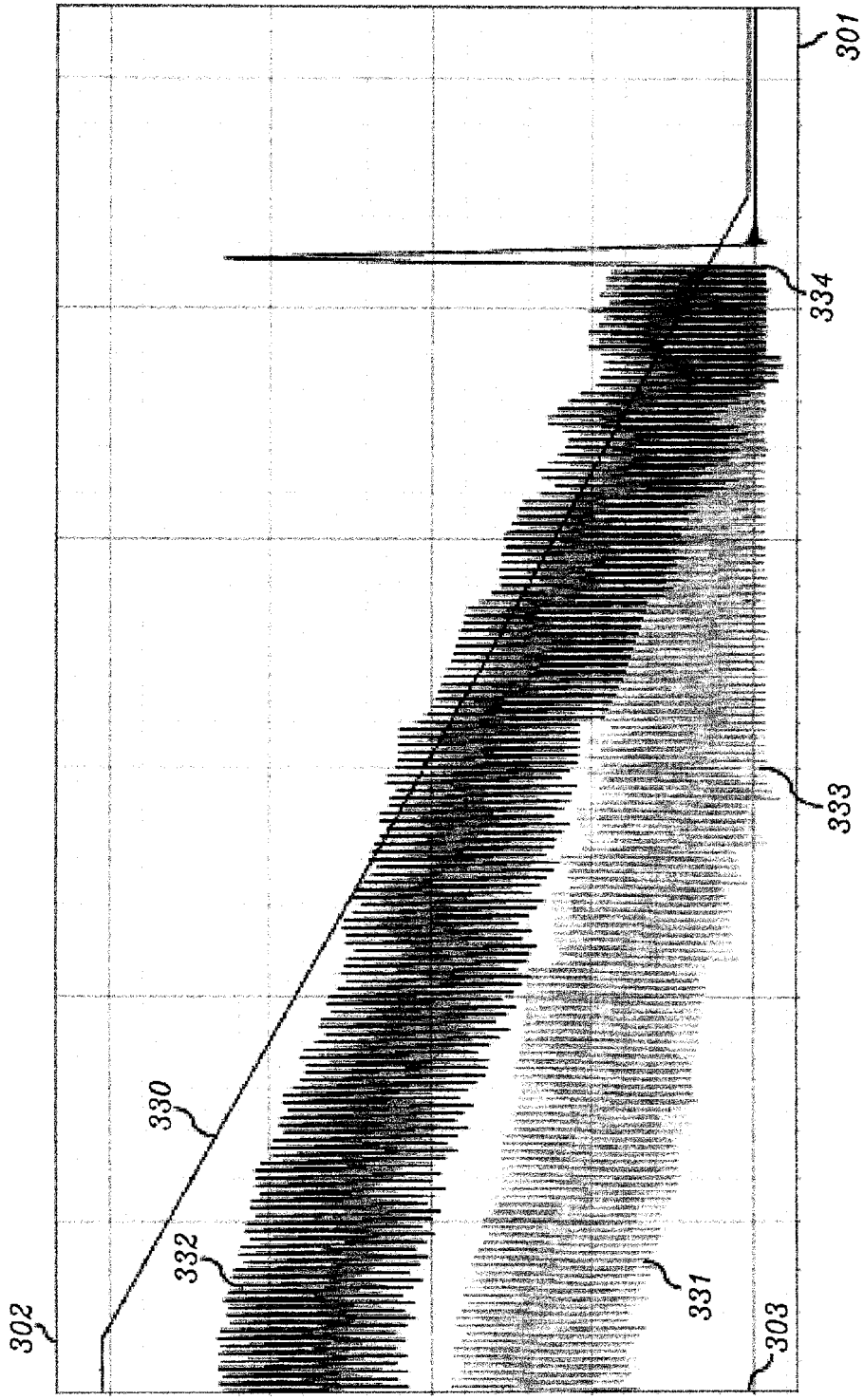

FIG. 3c shows the currents 302 in the multiphase converter 200, when using the above mentioned decision scheme for performing a transition from PWMmode to PFM mode. It can be seen that the second phase current 332 and the first phase current 331 decrease with decreasing load current 330. The first phase current 331 is smaller than the second phase current 332, i.e. the multiphase converter 200 exhibits a phase current offset. At time instant 333, the zero crossing of the first phase current 331 is detected, and the low side switch 202 of the first constituent power converter is operated as an active diode, in order to prevent negative phase currents. Possibly also the low side switches 222 of the other constituent power converters may be operated as active diodes starting from time instant 333 onwards. At time instant 334, the zero crossing of the second phase current 332 is detected. At this time instant 334, a zero crossing has been determined for all phases of the multiphase power converter 200. This is the trigger for transitioning the control of the multiphase converter 200 from PWMmode to PFM mode (as illustrated by the peak current subsequent to time instant 334).

Figure 4:
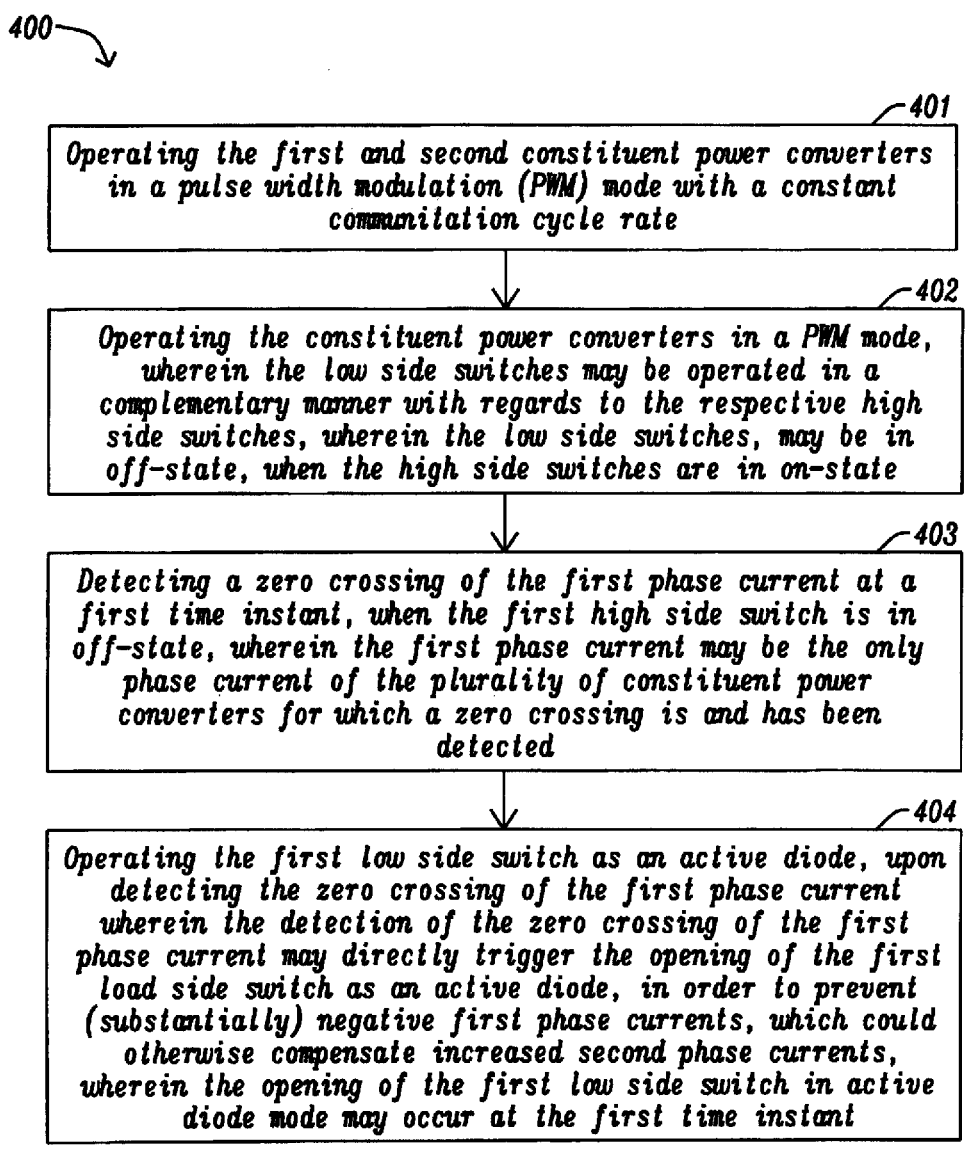
FIG. 4 shows a flow chart of an example method for controlling a multiphase power converter.

FIG. 4 shows a flow chart of an example method 400 for operating a multiphase power converter 200. The multiphase power converter 200 comprises a first and a second constituent switched-mode power converter, wherein the first and second constituent power converters comprise first and second half bridges with first and second high side switches 201, 221 and first and second low side switches 202, 222, respectively. The first and second constituent power converters provide first and second phase currents 331, 332, respectively, wherein the first and second phase currents 331, 332 contribute to a joint load current 330 of the multiphase power converter 200.

The method 400 comprises operating 401 the first and second constituent power converters in a pulse width modulation (PWM) mode with a constant commutation cycle rate. Operating the constituent power converters in a PWMmode may be performed as outlined in the context of FIG. 1. As part of the operation in PWM mode, the low side switches 202, 222 may be operated in a complementary manner with regards to the respective high side switches 201, 221 (step 402). In particular, the low side switches 202, 222 may be in off-state, when the high side switches 201, 221 are in on-state, and vice versa. The method 400 may proceed in detecting 403 a zero crossing of the first phase current 331 at a first time instant 333, when the first high side switch 201 is in off-state. The first phase current 331 may be the only phase current of the plurality of constituent power converters for which a zero crossing is and has been detected. The method 400 may further comprise operating 404 the first low side switch 202 as an active diode, upon detecting the zero crossing of the first phase current 331. In other words, the detection of the zero crossing of the first phase current 331 may directly trigger the operating of the first load side switch 202 as an active diode, in order to prevent (substantially) negative first phase currents, which could otherwise compensate increased second phase currents (as illustrated in FIG. 3c). The operating of the first low side switch 202 in active diode mode may occur at the first time instant 333.

In the present document a method and a corresponding system for compensating the impact of a phase current offset on the mode transition load current threshold for a multiphase DC-DC converter has been described. The described method ensures a transition from PWMmode to PFM mode, when the load current falls below a pre-determined load current threshold. As a consequence, a power efficient multiphase DC-DC converter can be provided, even for low load currents. Furthermore, the described method prevents a toggling between PWM mode and PFMmode. As a consequence, a stable multiphase power converter can be provided.

It should be noted that the multi-phase DC-DC converter comprises metal oxide semiconductor field effect transistor (MOSFET). It should be noted that the high (HS) switch can be a p-type metal oxide semiconductor field effect transistor (MOSFET). It should be noted that the low (LS) switch can be an n-type metal oxide semiconductor field effect transistor (MOSFET).

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A control circuit for a multiphase power converter; wherein the multiphase power converter comprises a first and a second constituent switched-mode power converter; wherein the first and second constituent power converters provide first and second phase currents, respectively; wherein the first and second phase currents contribute to a joint load current of the multiphase power converter; wherein the first and second constituent power converters comprise first and second half bridges with first and second high side switches and first and second low side switches, respectively; wherein the control circuit is configured to operate the first and second constituent power converters in a pulse width modulation (PWM) mode with a constant switching frequency;

operate the low side switches in a complementary manner with regards to the respective high side switches;

detect a zero crossing of the first phase current at a first time instant, when the first high side switch is in off-state; and operate the first low side switch as an active diode, upon detecting the zero crossing of the first phase current, while continuing to operate the second constituent power converter in the PWM mode with the constant switching frequency.

2. The control circuit of claim 1, wherein the control circuit is configured to subsequent to detecting the zero crossing of the first phase current, detect a zero crossing of the second phase current at a second time instant, when the second high side switch is in off-state; and subsequent to detecting the zero crossings of the first and second phase currents, operating the first and second constituent power converters in a pulse frequency modulation (PFM) mode with a variable switching frequency.

3. The control circuit of claim 1, wherein the control circuit is configured to determine that a zero crossing has been detected for all the phase currents of all the constituent power converters of the multiphase power converter; and subsequent to determining that a zero crossing has been detected for all the phase currents, operate all the constituent power converters of the multiphase power converter in a pulse frequency modulation (PFM) mode with a variable switching frequency.

4. The control circuit of claim 2, wherein the control circuit is configured to determine a time instant for turning on the first and/or second high side switches based on a joint output voltage of the multiphase power converter, when in PFM mode.

5. The control circuit of claim 1, wherein the control circuit is configured to determine that the first phase current exceeds a pre-determined current threshold;

upon determining that the first phase current exceeds the pre-determined load current threshold, abort the active diode operation of the first low side switch; and operate the first low side switch in a complementary manner with regards to the first high side switch.

6. The control circuit of claim 1, wherein the first phase current is smaller than the second phase current, due to a phase current offset of the multiphase power converter.

7. The control circuit of claim 1, wherein the control circuit is configured to operate the second low side switch as an active diode, upon detecting the zero crossing of the first phase current.

8. The control circuit of claim 1, wherein the control circuit is configured to determine a duty cycle of the first and/or second high side switches based on the joint load current and/or based on a joint output voltage of the multiphase power converter, when in PWM mode.

9. The control circuit of claim 1, wherein the control circuit is configured to turn off the first low side switch such that the first phase current does not fall below a pre-determined phase current threshold.

10. The control circuit of claim 1, wherein the control circuit is configured to set a zero crossing flag for a constituent power converter, subsequent to detecting a zero crossing of the respective phase current of the constituent power converter; and operate the multiphase power converter in a pulse frequency modulation (PFM) mode, if the zero crossing flags are set for all the constituent power converters of the multiphase power converter.

11. The control circuit of claim 10, wherein the control circuit is configured to reset the zero crossing flag for a constituent power converter, if an absence of a zero crossing of the respective phase current of the constituent power converter is detected.

12. The control circuit of claim 10, wherein the control circuit is configured to set the zero crossing flag for a constituent power converter, upon detecting a pre-determined number of zero crossings of the respective phase current of the constituent power converter within a pre-determined number of consecutive duty cycles.

13. The control circuit of claim 1, wherein the first and second constituent power converters comprise a first and second inductor, respectively; and the first and second phase currents traverse the first and second inductors, respectively.

14. A multiphase power converter comprising a first and a second constituent switched-mode power converter; wherein the first and second constituent power converters provide first and second phase currents, respectively; wherein the first and second phase currents contribute to a joint load current of the multiphase power converter; wherein the first and second constituent power converters comprise first and second half bridges with first and second high side switches and first and second low side switches, respectively; and a control circuit, for operating the first and second constituent power converters, wherein the control circuit is configured to operate the first and second constituent power converters in a pulse width modulation (PWM) mode with a constant commutation cycle rate;

operate the low side switches in a complementary manner with regards to the respective high side switches;

detect a zero crossing of the first phase current at a first time instant, when the first high side switch is in off-state; and operate the first low side switch as an active diode, upon detecting the zero crossing of the first phase current, while continuing to operate the second constituent power converter in the PWM mode with the constant switching frequency.

15. A method for operating a multiphase power converter; wherein the multiphase power converter comprises a first and a second constituent switched-mode power converter; wherein the first and second constituent power converters provide first and second phase currents, respectively; wherein the first and second phase currents contribute to a joint load current of the multiphase power converter; wherein the first and second constituent power converters comprise first and second half bridges with first and second high side switches and first and second low side switches, respectively; wherein the method comprises operating the first and second constituent power converters in a pulse width modulation (PWM) mode with a constant switching frequency;

operating the low side switches in a complementary manner with regards to the respective high side switches;

detecting a zero crossing of the first phase current at a first time instant, when the first high side switch is in off-state; and operating the first low side switch as an active diode, upon detecting the zero crossing of the first phase current, while continuing to operate the second constituent power converter in the PWM mode with the constant switching frequency.

16. The method of claim 15 wherein said multiphase power converter comprise N (N>1) constituent power converters.

17. The method of claim 16 wherein said power converters may be arranged in parallel with respect to one another.

18. The method of claim 15 wherein the first and second constituent power converters may comprise DC-DC power converters.

19. The method of claim 18 wherein said DC-DC power converter is a buck converter.

20. The method of claim 18 wherein said DC-DC power converter is a boost converters.

21. The method of claim 15 wherein said first and second constituent power converters comprise first and second half bridges with first and second high side switches and first and second low side switches, respectively.

22. The method of claim 21 comprises transistors, such as metal oxide semiconductor (MOS) field effect transistors (FETs).

\* \* \* \* \*